(12) United States Patent
Lawn et al.

(10) Patent No.: US 6,842,654 B2
(45) Date of Patent: Jan. 11, 2005

(54) SYSTEM, AND METHOD FOR ONLINE COLOR ALGORITHM EXCHANGE

(75) Inventors: Richard Lawn, Hong Kong (HK); Man Hon Shiew, Hong Kong (HK)

(73) Assignee: eWarna.com International Holdings Limited (VG)

( * ) Notice: Subject to any disclaimer, the term of this patent is extended or adjusted under 35 U.S.C. 154(b) by 125 days.

(21) Appl. No.: 09/971,976

(22) Filed: Oct. 4, 2001

(65) Prior Publication Data

US 2002/0042842 A1 Apr. 11, 2002

Related U.S. Application Data

(60) Provisional application No. 60/238,176, filed on Oct. 5, 2000.

(51) Int. Cl.[7] .............................................. G06F 17/00
(52) U.S. Cl. ........................... 700/90; 382/165; 705/26
(58) Field of Search ..................... 700/89, 90; 382/165; 709/203; 707/10; 705/26

(56) References Cited

U.S. PATENT DOCUMENTS

| | | |
|---|---|---|
| 3,568,155 A | 3/1971 | Abraham et al. |
| 4,029,419 A | 6/1977 | Schumann, Jr. et al. |
| 4,318,121 A | 3/1982 | Taite et al. |
| 4,418,390 A | 11/1983 | Smith et al. |
| 4,488,245 A | 12/1984 | Dalke et al. |
| 4,523,852 A | 6/1985 | Bauer |
| 4,931,929 A | 6/1990 | Sherman |
| 5,311,212 A | 5/1994 | Beretta |
| 5,493,490 A | 2/1996 | Johnson |
| 5,506,696 A | 4/1996 | Nakano |
| 5,677,967 A | 10/1997 | Pariser |
| 5,764,800 A | 6/1998 | Yamagata |
| 5,798,943 A | 8/1998 | Cook et al. |
| 5,799,285 A | 8/1998 | Klingman |
| 5,842,178 A | 11/1998 | Giovannoli |
| 5,845,265 A | 12/1998 | Woolston |
| 5,924,082 A | 7/1999 | Silverman et al. |
| 5,991,739 A | 11/1999 | Cupps et al. |
| 6,058,357 A | 5/2000 | Granger et al. |
| 6,081,253 A | 6/2000 | Luke et al. |
| 6,101,483 A | 8/2000 | Petrovich et al. |
| 6,125,352 A | 9/2000 | Franklin et al. |
| 6,131,087 A | 10/2000 | Luke et al. |
| 6,141,653 A | 10/2000 | Conklin et al. |
| 6,151,588 A | 11/2000 | Tozzoli et al. |
| 6,167,386 A | 12/2000 | Brown |
| 6,337,922 B2 * | 1/2002 | Kumada ..................... 382/162 |
| 6,342,952 B1 * | 1/2002 | Chan .......................... 358/1.9 |
| 6,349,300 B1 * | 2/2002 | Graf et al. .................. 707/100 |
| 6,411,953 B1 * | 6/2002 | Ganapathy et al. ............ 707/6 |

(List continued on next page.)

FOREIGN PATENT DOCUMENTS

| | | |
|---|---|---|
| EP | 0 855 687 A2 | 7/1988 |
| WO | WO 98/18093 A1 | 4/1998 |

OTHER PUBLICATIONS

Meier, B.J., "Ace: A color Expert System For User Interface Design", Symposium on User Interface Software and Technology, pp. 117–128 (1998).

Bajaj, C. et al., "Web Based Collaborative CAAD", Proceedings of the 5th Symposium on Solid Modeling and Applications, pp. 326–327, (Jun. 1999).

*Primary Examiner*—Paul Rodriguez
(74) *Attorney, Agent, or Firm*—Schwabe, Williamson & Wyatt, P.C.

(57) ABSTRACT

An online algorithm exchange is presented herein. The online algorithm exchange provides access to a plurality of coloring algorithms from any number of developers. Users can select a particular algorithm for use as well as specify particular color measurements as inputs thereto. The color measurements can be selected from a database at the algorithm exchange, or provided by the user from a client terminal.

14 Claims, 3 Drawing Sheets

U.S. PATENT DOCUMENTS 6,507,824 B1 * 1/2003 Yon et al. ..................... 705/26
6,539,325 B1 * 3/2003 Numata et al. ............. 702/127
2001/0052904 A1 * 12/2001 Sano et al. ................. 345/589
2003/0149504 A1 * 8/2003 Iwaki et al. ................ 700/117

* cited by examiner

SYSTEM, AND METHOD FOR ONLINE COLOR ALGORITHM EXCHANGE

CLAIM OF PRIORITY

This application claims the priority benefit of Provisional Application for U.S. Patent Ser. No. 60/238,176, entitled "Online Algorithm Exchange", filed Oct. 5, 2000, by Richard Lawn and Man Hon Shiew, and which is hereby incorporated by reference for all purposes.

BACKGROUND

The color of an object as perceived by a human observer is a complex result of the physical properties of the light illuminating it, the effects on the observer of the surrounding environment and the individual physical and mental characteristics of the observer. Only the first two of these four items can be measured instrumentally with any precision and repeatability. However, the color of most goods marketed in the world economy is often a vital ingredient of their appeal to the buyer and therefore this perceived sensation is of enormous economic importance.

So many companies have, as their principal value added activity, the coloration of goods to a specific perceived target shade, usually by processes involving the applications of precisely calculated mixtures of a few basic colorants. To do this scientifically, they work with instrumentally measured data on the reflectance of the target and the colorants at various wavelengths, combine with data on the illuminants under which a match to a target is required. They may then use mathematical models or algorithms, known as recipe prediction algorithms, which attempt to predict which ratio of basic colorants will give the nearest match of total reflectance to the target reflectance. These recipe prediction algorithms, however, can never perfectly predict the interactions between colorants and substrates and so many researchers have developed many differing recipe prediction algorithms often a particular recipe prediction algorithm is particularly good for one use (e.g., metallic paints) but poor for another (e.g., textiles in UV light).

Many other companies and individuals earn an income making less specific recommendations about color. For example, some paint companies have developed algorithms, known as color recommendation algorithms, which attempt to tell users which paint color will "look good" with a particular carpet color if a "warm" look is needed. Others recommend which dress colors are appropriate for spring weddings, or what colors to wear for a power breakfast, or why black is a bad color for bathrooms.

Because recipe prediction algorithms and color prediction algorithms are optimized for different purposes, it is desirable for users to have access to an assortment of recipe prediction algorithms and color recommendation algorithms, each of which are optimized for a certain purpose. Access to a sufficiently broad assortment is often difficult for the user. Recipe generation algorithms and color recommendation algorithms are usually proprietary, therefore, the user cannot easily build a private collection. Additionally, different algorithms for different purposes are often available with different merchants. It is not necessarily the case that a single company will have an algorithm for a particular purpose. Therefore, the user must locate a company with the particular algorithm best suited for the user's purpose. The various companies with the different algorithms can be sparsely located throughout the world. Therefore, it is often inconvenient for the user to have knowledge and access to each of the companies.

Additionally, the color measurements, which are inputs to these algorithms have to be provided to the algorithm in the form of measurements in accordance with a particular predetermined color measurement standard, such as a reflectance curve or a description of the color using the CIE 1976 L*a*b format. Therefore, even upon location of the particular algorithm, the user must have a way of providing the input colors to the algorithm. Color measurements are provided by measurement of a color sample with an instrument known as a spectrophotometer. The spectrophotometer takes various physical and light wavelength measurements of the color. The result of the foregoing measurements can be provided to the algorithm. However, spectrometers are generally expensive instruments and many users may not have access to them. Such user would need to find other ways to provide the color data to the color algorithm. In other cases, the user may not have an actual sample.

Accordingly, it would be advantageous if the user was provided access to recipe generation algorithms and color recommendation algorithms from vendors worldwide.

It would also be advantageous if users could be provided a simple manner in which to provide the color information for the algorithm inputs.

SUMMARY

Presented herein is a system, method, and apparatus for an algorithm online exchange. The online algorithm exchange can store information regarding the coloring algorithms of developers allowing users to review the information and selection a particular coloring algorithm best suited for the user's application. The user can either have forwarded color measurements taken by the user at the user's premises, or can have a specified color measurement data forwarded to the color measurement algorithm. The algorithm exchange includes a database for storage of color measurement associated with particular color samples. The user can specify a particular color measurement for use by the color algorithm.

DETAILED DESCRIPTION

Figure 1:
FIG. 1 is an illustration of a block diagram of an algorithm exchange.

Referring now to FIG. 1, there is illustrated a block diagram of an Algorithm Exchange 100. The algorithm exchange links any number of users 105 which use recipe generation algorithms and color recommendation algorithms and any number of developers 110 which develop recipe generation algorithms and color recommendation algorithms (now collectively referred to as coloring algorithms). The users 105 can include, but are not limited to dyehouses, textile printers, printers, interior designers, color specifiers, and garment buyers. The developers can include but are not limited to academic institutions, stylists, artists, software developers, color researchers, medical researchers, and home decor suppliers.

The algorithm exchange 100 stores information regarding the coloring algorithms of the developers 110. The user can review the information regarding the coloring algorithms, and select a particular coloring algorithm best suited for the user's application. Upon selecting the algorithm best suited for the user's application, the user can forward color data to the algorithm exchange 100. Alternatively, the user 105 can designate color data in a database associated with a color exchange system. The color data can include data relating to the physical measurements of a color, such as measurement provided by a spectrophotometer, calorimeter, digital camera, digital scanner or the like, in a recognized color data format, such as a reflectance curve or the CIE 1976 L*a*b format.

The algorithm exchange 100 forwards the color data from the user 105 or color exchange to the developer 110 associated with the recipe generation algorithm, wherein the data is used as inputs to the coloring algorithm. The developer 110 can then use the coloring algorithm to calculate a resulting recipe or color recommendation (now collectively referred to as resulting data). The resulting data is forwarded to the algorithm exchange 100 which sends the resulting data to the user 105.

Additionally, the algorithm exchange 100 can be configured to accept payment on a per transaction basis for each developer and the algorithms associated therewith. The algorithm exchange 100 can selectively provide access to coloring algorithms after receiving appropriate billing instructions from the user 105. Responsive to receipt of the resulting data, the algorithm exchange 100 can forward the payment to the developer 110.

Figure 2:
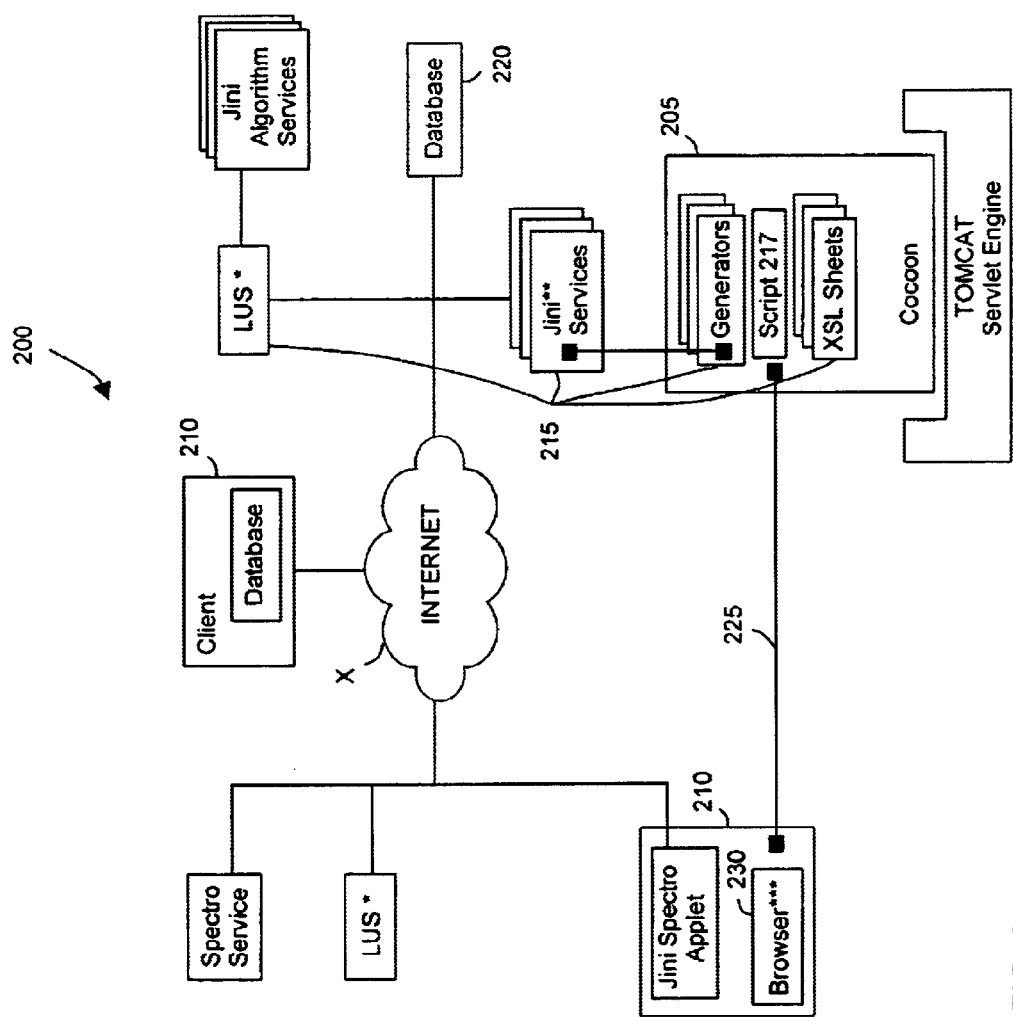
FIG. 2 is an illustration of a high-speed communication network.

Referring now to FIG. 2, there is illustrated a block diagram of a high-speed communication network, referenced generally by the numeral designation 200, for facilitating the algorithm exchange 100. The computer network 200 comprises at least one server 205 and any number of client computers 210. The resources centralized by the server 205 can include, for example, application program 215 and databases 220. The application program 215 comprises a series of executable instructions, some of which may be stored in memory at the server 205, and is preferably a multi-user program which can be simultaneously used by large numbers of client computers 210.

The client computers 210 access the centralized resources by establishing an input/output connection with the server 205, known as a client/server connection. The client/server connection is established by means of a communication channel 225. The communication channel 225 includes any combination of communication media, such as, for example, but not limited to, a coaxial cable, a fiber optic link, a wireless radio link, or a connection within the public switched telephone network. Another type of communication media is known as the Internet. The Internet comprises any number of local area networks (LANs) and wide area networks (WANs), from corporations, educational institutions, the military, and government agencies from around the world, connected together by means of high capacity data links.

In many cases, the client computer 210 and the server 205 are both directly connected to the Internet. The client computer 210 and server 205 communicate by addressing and sending data packets in accordance with the protocols of the Internet, thereby establishing client/server connections. Alternatively, the client computer 210 can establish a connection using connection media (usually a connection within a public switched telephone network) with an Internet port known as an Internet service provider (ISP) and then use the Internet to establish a connection from the ISP to the client computer 210.

The algorithm exchange 100 can be associated with the server 205 while the users 105 and developers 110 can access the algorithm exchange 100 via client computers 210.

Implementation in the foregoing manner allows for instantaneous communication. Additionally, the centralized nature of server 205 permits storage of information regarding the developers' 110 coloring algorithms in the remotely accessible database 220. The server 205 is preferably directly connected to the Internet, and at least a major component of the communication channel comprises the Internet, thereby permitting access from client computers 210 located virtually anywhere in the world.

The application program 215 can provide searchable access to the information regarding the algorithms stored in the database, allows users to select the algorithm best suited for the user's application, and receive the color data from storage within the client terminal associated with the user. Alternatively, the application program 215 can retrieve the color data from a database associated with a color exchange system. The application program 215 can also forward the color data to the developer 110 associated with the selected coloring algorithm, receive the resulting data, and forward the resulting data to the user 105. The selected coloring algorithm can be stored at the client terminal associated with the developer 110 and executed thereat. Additionally, the application program 215 can be configured to receive billing instructions from the user 105 and forward payment to the developer 110.

Additionally, a script program 217 can be used to provide access to the application program 215. The script program 217 displays a web page which interfaces the client to the application program 215. The web page serves a graphical user interface for the user 105 and developer 110, wherein inputs, such as color data, can be displayed. The script program 217 is preferably written in a high-level programming language such as Java which is universally executable by a program known as a browser 230 at clients associated with the user 105 and developer 110.

Figure 3:
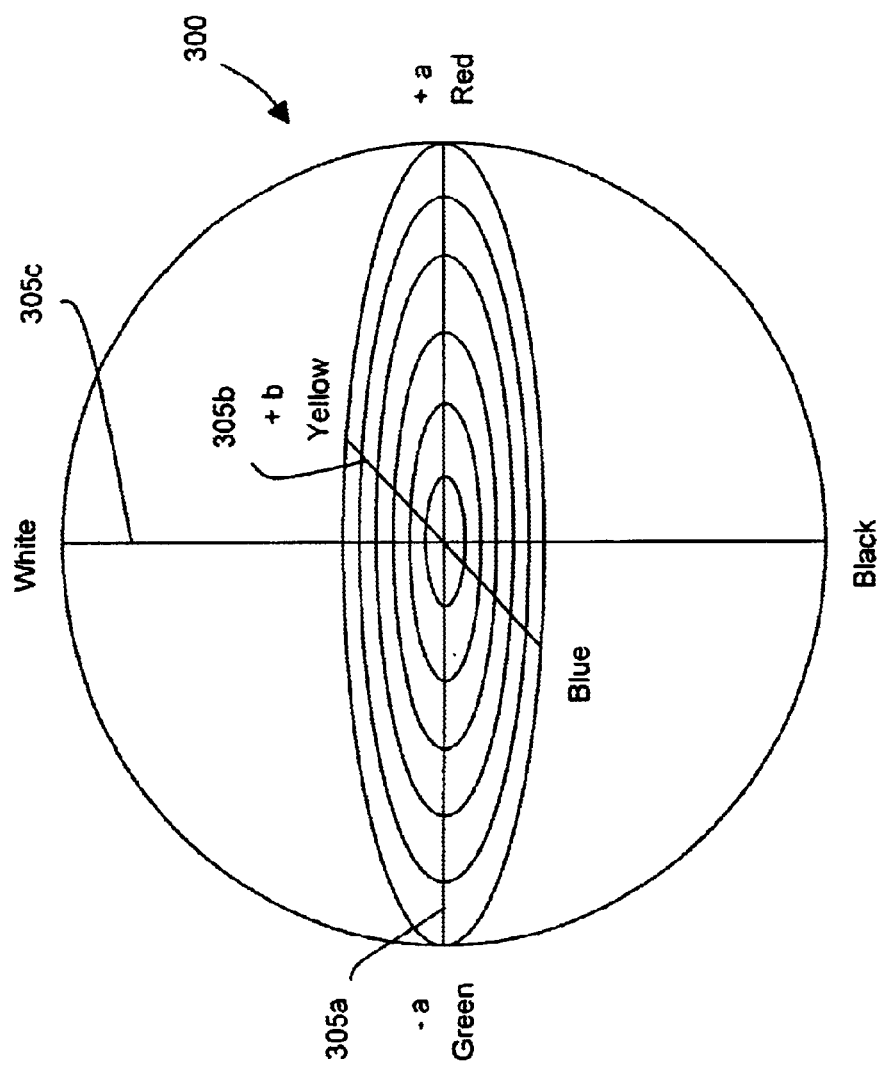
FIG. 3 is a diagram of a color space.

Referring now to FIG. 3, there is illustrated a diagram of a color space, referenced generally by the numeral designation 300, for describing a color. The most widely used color space 300 is established by the Commission Internationale de l'Eclairage (CIE) (a.k.a. International Commission on Illumination), an organization devoted to international cooperation and exchange of information among its member countries on matters relating to the science and art of lighting/illumination). The color space 300 is known as the CIE 1976 L*a*b* color space. The CIE 1976 L*a*b* is a mathematical model describing color sensations (caused by light from a particular illuminant reflecting from an object with particular reflectance properties as measured by a reflectance curve, for example) and is based on the color describing theory of opponent colors. The concept follows that colors can be considered as combinations of red and green, yellow and blue, and black and white. One advantage is of the CIE 1976 L*a*b* is that the differences between colors agree consistently well with visual perceptions of the differences. A given color is associated with a series of parametric measurements measuring red/green factor, blue/yellow factor, and black/white factor. These measurement uniquely describe the color and can be represented as a point in a three-dimensional color space 300, where the red/green parametric measurement is plotted as point on a red/green axis 305*a*, where the blue/yellow parametric measurement is plotted as point on a blue/yellow axis 305*b*, and where the black/white parametric measurement is plotted as point on a black/white axis 305*c*.

The color measurements for use by the particular coloring algorithm can be selected under particular chosen illuminant conditions via the use of the color space 300. Additionally, this information can be catalogued and stored as records in a data structure emulating the color space 300 in database 220 with the data record being the reflectance curve, for example. The foregoing data structure would sort and allow such records to be searched by the visual appearance of the colors.

Although preferred embodiments of the present inventions have illustrated in the accompanying Drawings and described in the foregoing Detailed Description, it will be understood that the inventions are not limited to the embodiments disclosed, but are capable of numerous rearrangements, modifications and substitutions without departing from the spirit of the invention as set forth and defined by the following claims and equivalents thereof.

What is claimed is:

1. An algorithm exchange for providing a user access to coloring algorithms that are operable to provide color recipes or color scheme recommendations when processed with color data, said algorithm exchange comprising:

a server configured to receive from at least one algorithm developer information regarding optimizing use of each of a plurality of coloring algorithms for substrate type, color recommendations, or colorant type;

a database coupled to the server and configured to store the information; and wherein the server is further configured to provide the user access to the information via a client computer associated with the server, and to facilitate selection by the user of at least one of the plurality of coloring algorithms based on the information and on a particular application provided by the user.

2. The algorithm exchange of claim 1, wherein the server is configured to receive the selected at least one of the plurality of coloring algorithms, and further configured to provide the selected at least one of the plurality of coloring algorithms to the user.

3. The algorithm exchange of claim 2, wherein the server further comprises a computer readable medium for storing a script program, said script program providing the user access to the plurality of coloring algorithms.

4. The algorithm exchange of claim 1, wherein the server is further adapted to receive at least one color measurement from the client computer, and the database is further adapted for storing the received at least one color measurement.

5. The algorithm exchange of claim 4, wherein the at least one color measurement is used as an input to one or more of the selected at least one of the plurality of coloring algorithms for providing resulting color data to the client computer from the server.

6. The algorithm exchange of claim 1, wherein each of the plurality of coloring algorithms provides a color recipe when processed with color data.

7. The algorithm exchange of claim 1, wherein each of the plurality of coloring algorithms provides a color recommendation scheme when processed with color data.

8. A method for selecting a coloring algorithm that is operable to provide color recipes or color scheme recommendations when processed with color data, said method comprising:

receiving in a server from at least one algorithm developers information regarding optimizing use of each of a plurality of coloring algorithms for substrate type, color recommendations, or colorant type;

storing the information in a database associated with the server;

providing the information from the server to a user via a client computer; and receiving at the server a selection of at least one of the plurality of coloring algorithms from the user via the client computer, the selection based on the information and a particular application decided by the user.

9. The method of claim 8, further comprising receiving at least one color measurement from the user via the client computer for use as an input to the selected at least one of the plurality of coloring algorithms for providing resulting color data to the client computer.

10. The method of claim 9, further comprising storing the at least one color measurement in the database.

11. The method of claim 8, further comprising receiving at least one of the plurality of coloring algorithms by the server, and storing the received at least one of the plurality of coloring algorithms in the database.

12. The method of claim 10, further comprising receiving the selected at least one of the plurality of coloring algorithms at the server, and providing the selected at least one of the plurality of coloring algorithms to the user.

13. The method of claim 8, wherein each of the plurality of coloring algorithms provides a color recipe when processed with color data.

14. The method of claim 8, wherein each of the plurality of coloring algorithms provides a color recommendation scheme when processed with color data.

* * * * *

UNITED STATES PATENT AND TRADEMARK OFFICE
CERTIFICATE OF CORRECTION

PATENT NO. : 6,842,654 B2
DATED : January 11, 2005
INVENTOR(S) : Lawn et al.

It is certified that error appears in the above-identified patent and that said Letters Patent is hereby corrected as shown below:

Column 1,
Line 38, "algorithms often…" should read -- algorithms - often… --;
Lines 57-58, "…usually proprietary, therefore,…" should read -- …usually proprietary; therefore,… --;

Column 2,
Line 13, "However, spectrometers are" should read -- However, spectrophotometers are --;

Column 3,
Line 5, "…spectrophotometer, calorimeter,…" should read -- …spectrophotometer, colorimeter,… --;
Line 33, "…program 215com-" should read -- program 215 com --;

Column 4,
Line 57, "These measurement" should read -- These measurements --.

Column 6,
Lines 13-14, "…developers information…" should read -- …developer, information… --; and
Line 37, "…claim 10,…" should read -- …claim 11… --.

Signed and Sealed this

Fourteenth Day of February, 2006

JON W. DUDAS
*Director of the United States Patent and Trademark Office*